Patented Mar. 24, 1936

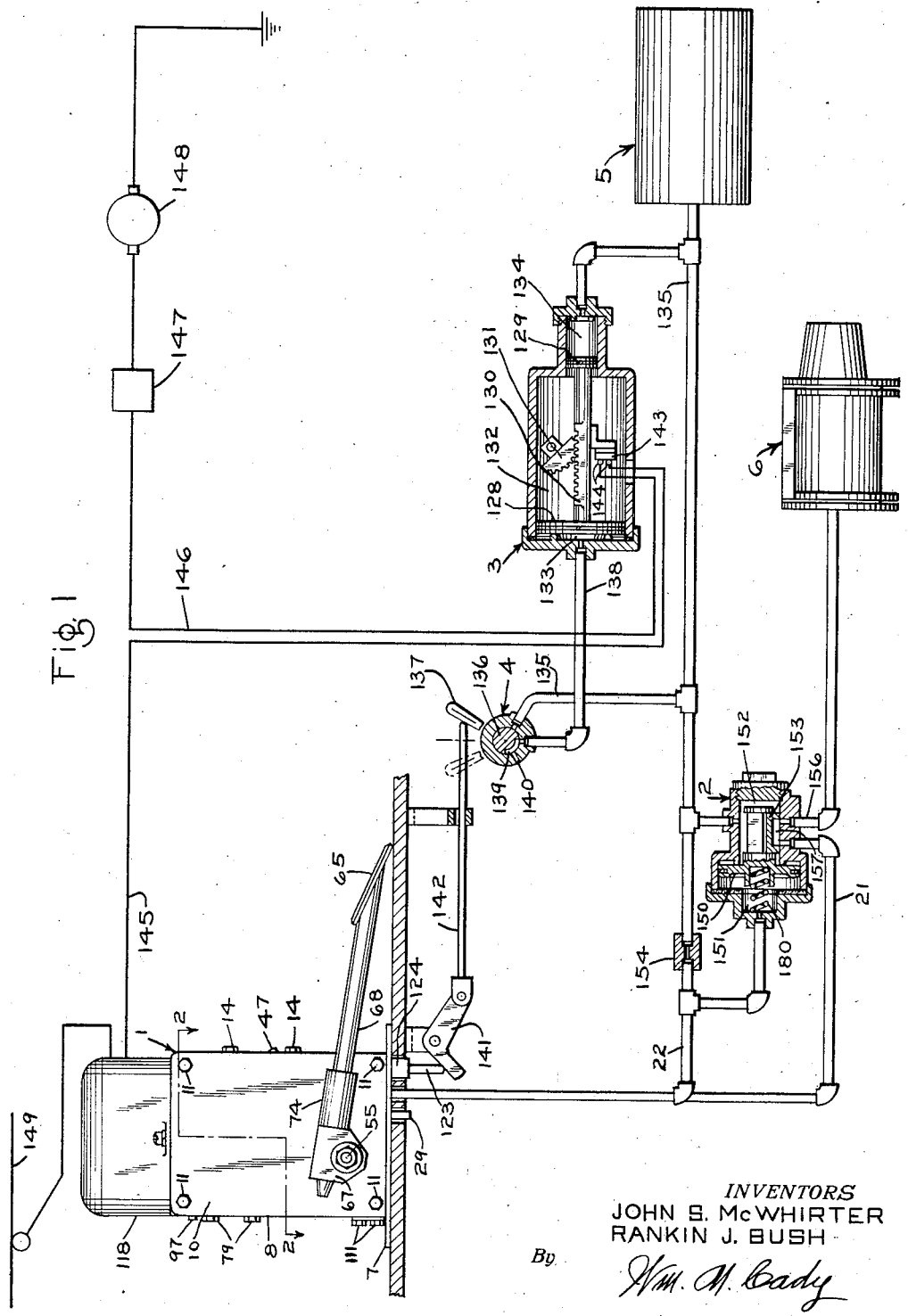

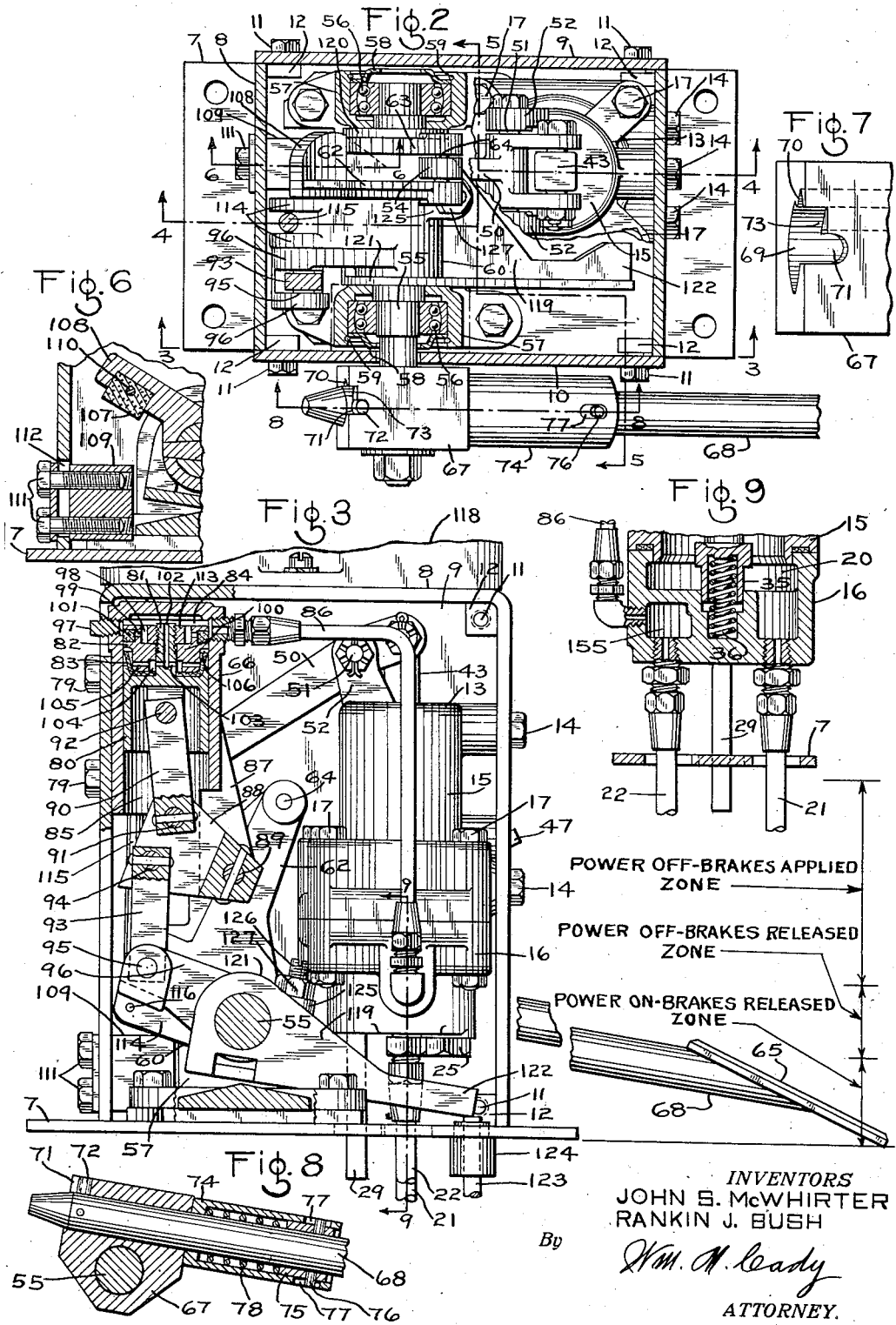

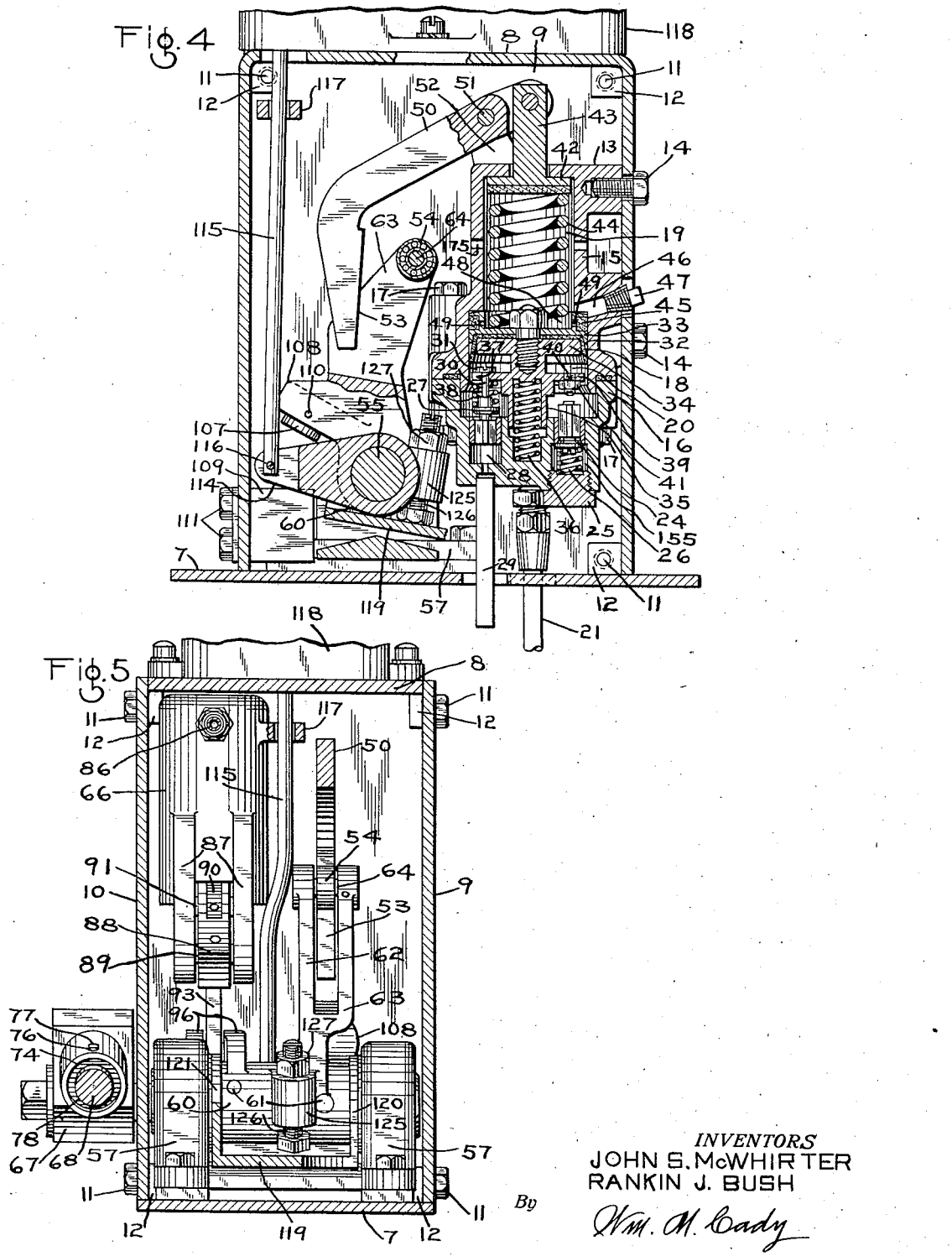

2,035,089

UNITED STATES PATENT OFFICE 2,035,089

BRAKE VALVE DEVICE

John S. McWhirter, Southport, Conn., and Rankin J. Bush, Jeannette, Pa., assignors to The Westinghouse Air Brake Company, Wilmerding, Pa., a corporation of Pennsylvania Application November 26, 1932, Serial No. 644,448

21 Claims. (Cl. 303—50)

This invention relates to fluid pressure brake equipment and more particularly to the type employed for controlling the brakes on traction cars.

It has heretofore been proposed, in connection with a brake equipment of the above type, to provide a brake valve device subject to the opposing pressures of a spring and a manually operated pedal and operative by said spring upon the relief of manual pressure on the pedal to effect an application of the brakes, a stop generally being provided to limit the movement of the parts of the brake valve device by said spring to some predetermined position. If the spring in a brake valve device of the above character should become broken it would be impossible to apply the brakes by operation of the brake valve device, furthermore, since a spring will expand almost instantly, it would, upon the complete relief of manual pressure on the pedal, cause such sudden operation of the brake valve parts as to deliver a blow to the stop of such intensity as to tend to break the parts of the device.

One object of the invention is to provide an improved brake valve device of the above character in which fluid under pressure acting on a movable abutment is employed in place of a spring.

By thus employing fluid under pressure in place of the usual spring, the possibility of failure to obtain an application of the brakes, due to the broken spring, is avoided and since the rapid movement of the fluid pressure operated abutment causes a momentary reduction in the actuating pressure, the force delivered to the stop member is considerably less than in the case of a spring. Furthermore, due to friction between the movable abutment and its cylinder and on account of the inertia of the abutment, the movement of the abutment is inherently slow as compared to the almost instantaneous expansion of a spring, and this characteristic in addition to the above explained momentary reduction in the pressure of the actuating fluid materially reduces the blow delivered to the stop and therefore reduces the possibility of breakage of the parts of the device.

In a brake valve device of the character employing a spring operative upon the relief of manual pressure on a pedal to apply the brakes, the breaking of the spring will prevent obtaining an application of the brakes and with the pedal pressed to the brakes released position, it is possible that a broken spring would not be evident until the operator desired to apply the brakes, and then, since the brakes could not be applied, a serious wreck might result.

Another object of the invention is to overcome the above difficulty by providing an improved brake valve device in which a movable abutment is operated by fluid under pressure upon the relief of manual pressure on a foot pedal for effecting an application of the brakes, the movable abutment being subject at all times to and operated by fluid under pressure from the usual emergency pipe so that if the fluid under pressure for operating the abutment becomes lost an emergency application of the brakes will automatically occur.

In a brake valve device of the type in which the brakes are applied upon relief of manual pressure on a foot pedal, and released when manual pressure is increased on the foot pedal, it is less fatiguing to the operator if the foot pressure required to hold the pedal in any of its various positions is relatively low and substantially constant at all times.

Another object of the invention is to provide a brake valve device controlled by fluid under pressure acting on a movable abutment in opposition to manual pressure acting on a foot pedal and means for varying the power delivered by said abutment for controlling the operation of said brake valve device in accordance with the power required to operate said brake valve device, so that the opposing manual pressure on the foot pedal will at all times remain substantially constant.

Other objects and advantages will appear in the following more detailed description of the invention.

In the accompanying drawings: Fig. 1 is a diagrammatic view, partly in section, of a fluid pressure brake equipment embodying the invention; Fig. 2 is a sectional view of the manually controlled brake and power controlling device shown in Fig. 1 and taken on the line 2—2; Fig. 3 is a sectional view of the manually controlled brake and power controlling device taken on the line 3—3 of Fig. 2; Fig. 4 is a sectional view of the manually controlled brake and power controlling device taken on the line 4—4 of Fig. 2; Fig. 5 is a sectional view of the manually controlled brake and power controlling device taken on the line 5—5 of Fig. 2; Fig. 6 is a sectional view taken on the line 6—6 of Fig. 2; Fig. 7 is an enlarged plan view of a portion of the foot pedal carrying block shown in Fig. 2; Fig. 8 is a sectional view taken on the line 8—8 of Fig. 2; and Fig. 9 is a sectional view taken on the line 9—9 of Fig. 3.

As shown in Fig. 1 of the drawings; the fluid pressure brake equipment comprises a manually controlled brake and power controlling device 1, an emergency valve device 2, a car door operating engine 3, a car door engine control valve device 4, a main reservoir 5 and a brake cylinder 6.

The control device 1 includes a brake valve device for controlling the car brakes and means whereby the opening of a car door and the control of the car motive power are interlocked with the braking of the car, and the control device comprises a base plate 7 which may be secured to the floor of a car, a substantially U shaped member 8 open at opposite sides and secured to the base plate 7 in an inverted position by welding the ends of the two legs of the member to said plate, a side plate 9 removably secured to one side of the U shaped member 8, and a side plate 10 removably secured to the opposite side of the U shaped member 8. The side plates 9 and 10 are preferably secured to the member 2 by means of a plurality of cap screws 11 having screw-threaded engagement in corresponding lugs 12 welded to the member 8 as indicated in the drawings. In this manner, a box like housing, having removable sides and a base for mounting, is provided for carrying the operating mechanism which will now be described.

A brake controlling valve device 13 is disposed within the housing and is secured to one side of the member 8 preferably by cap screws 14 extending from the outside of said member through suitable apertures therein and having screw-threaded engagement in the casing of the brake controlling valve device.

The brake controlling valve device 13 comprises two casing sections 15 and 16, preferably secured to each other by means of a plurality of bolts 17. A movable abutment 18 is contained in the casing section 15 and provides at one side a chamber 19 which may be open at all times to the atmosphere by way of a passage 175 and provides at the opposite side a chamber 20 which normally communicates with the brake cylinder 6 through pipe 21 and the emergency valve device 2.

The brake valve device 13 is provided with a chamber 155 connected to an emergency pipe or fluid pressure supply pipe 22, as indicated in Fig. 9, and contains a brake application valve 24 provided with a fluted stem extending through a suitable bore in the casing and into the brake cylinder chamber 20. In order to permit removal of valve 24, a screw-threaded opening is provided below the valve in which a threaded plug 25 is screwed. A spring 26 is interposed between the plug 25 and valve 24 for urging said valve into engagement with its seat.

A brake release valve 27 is contained in chamber 20 and is adapted to control communication from chamber 20 to the atmosphere through a chamber 28 and a short piece of pipe 29 secured in the brake valve casing section 16 and opening to the atmosphere through the base plate 7. The brake release valve 27 seats in a direction opposite to that of the supply valve 24 and is provided with an upwardly extending stem 30 terminating in an enlarged head-like portion 31.

The movable abutment 18 preferably comprises a cup type piston packing 32 secured between a piston member 33 and a follower member 34. The follower member 34 is provided with a sleeve-like guide portion 35 slidably projecting into a suitable bore in the lower casing section 16. A spring 36, extending into a chamber in the guide portion 35, acts against the casing section and engages the member 34 to bias the abutment 18 to the release position, as shown in Fig. 4.

The guide portion 35 is provided on one side with an operating arm 37 which is preferably forked to receive the exhaust valve stem 30 and normally engages the head portion 31 of said stem to lift the exhaust valve 27 from its seat. A spring 38 is interposed between the exhaust valve 27 and arm 37 for seating said valve upon downward movement of the abutment 18 and for then permitting said abutment to move relatively to said exhaust valve.

The guide portion 35 is provided on the opposite side with an operating arm 39 which is provided, directly over the stem of the supply valve 24, with an operating stud 40 which is adapted, upon downward movement of the abutment 18 and after the exhaust valve 27 is seated, to engage the stem of the supply valve 24 and unseat said supply valve. The stud 40 is preferably screw-threaded into the operating arm 39 so that the amount of lap or movement between the seating of the exhaust valve 27 and the unseating of the supply valve 24, or vice versa, may be adjusted as desired. The stud 40 is then locked in its adjusted position by means of a lock nut 41.

The piston member 33 is provided with an annular recess preferably provided with a felt packing 45 engaging the cylinder wall of chamber 19. The casing section 15 is provided with a passage 46 normally closed by a plug 47 having screw-threaded engagement with the casing section and accessible from the outside of the control device housing section 8, so that oil or other lubricant may be supplied to chamber 19 when desired. The upper side of the piston member 33 is provided with a reservoir-like cavity 48 for receiving such lubricant and a plurality of passages 49 connect cavity 48 to the felt packing 45 so that lubricant will flow from said cavity and be absorbed by said felt packing and then upon movement of the abutment 18 the lubricant will be spread upon the cylinder wall in which said abutment operates.

Mounted in chamber 19 is a movable member 42 provided with an extension 43 which projects through an aperture in the casing section 15 and interposed between said member and the abutment 18 is a spring 44. An operating lever 50 having one end pivotally connected to the extension 43 is pivotally mounted on a pin 51 carried by two spaced lugs 52 projecting from the casing section 13. The outer end of the longer arm of the operating lever 50 is bent and provided with an operating face 53 adapted to be engaged by a roller 54 for controlling the operation of the brake valve device as will be hereinafter described.

Foot controlled means are provided for controlling the operation of the brake valve device 13 through the medium of the lever 50, said foot controlled means comprising a rock shaft 55 journaled in spaced roller bearings 56 which are carried by brackets 57 preferably secured to the base plate 7 of the control device housing. A grease retaining washer 58 is secured over the end of each roller bearing assembly by means of a snap ring 59 secured in a suitable annular groove in the bracket 57.

A lever member 60 is mounted on the rock shaft 55 and is secured thereto by means of two pins 61 driven into suitably aligned bores through said lever member and rock shaft.

The lever member 60 is provided with two similar, spaced lever arms 62 and 63, the lever arm 62 extending upwardly on one side of the brake valve lever 50 while the lever arm 63 extends upwardly on the opposite side. At no time does the brake valve lever 50 move out from between the lever arms 62 and 63 so that the brake valve lever 50 is always maintained in the proper operating relation with respect to the roller 54, which is carried by a pin 64 secured in the ends of the lever arms 62 and 63.

One end of the rock shaft 55 extends through the side plate 10 of the control device housing and rigidly secured to the end of said shaft is a block 67. The block 67 is provided with a through bore 69 adapted to slidably receive a lever arm 68 which carries a foot operated pedal 65. A groove 70 is provided in the block 67, which groove opens into and is in longitudinal alignment with the bore 69. At one end of the block one side wall of groove 70 is cut away and provides an opening 73 from said groove to a recess 71.

The arm 68 of the foot operated pedal is provided with a pin 72 and in assembling the arm 68, when the arm is passed into the bore 69, the pin 72 moves with the arm in the groove 70. When the pin 72 arrives at the opening 73 in the side wall of groove 70, the arm 68 is then turned so that the pin 72 lines up with the recess 71, at which time the foot pedal 65 is positioned in the operating position, illustrated in Fig. 3.

In order to hold the arm 68 locked in its operating position in block 67, there is mounted on the arm 68 a sleeve 74. A bushing 75 is secured to the arm by means of a pin 76, and said pin extends into elongated slots 77 provided in the sleeve 74. A coil spring 78 is interposed between the bushing 75 and the end of the sleeve 74, and the sleeve is so positioned that when the arm 68 is passed through the bore 69 in block 67, the end of the sleeve engages block 67 before pin 72 has moved out into the opening 73, so that the spring is compressed when the pin 72 is moved into said opening and the spring then operates to urge the pin 72 into the recess 71. With the pin 72 engaging in recess 71, the pedal arm 68 is held against rotation so as to fix the operating position of the foot pedal 65. In order to remove pedal 65 and pedal arm 68 from the block 67, the pedal arm is first moved inwardly of the block against the opposing pressure of spring 78 to disengage pin 72 from recess 71, and then the arm is turned to the position in which pin 72 registers with groove 70. The arm 68 is then pulled out of bore 69, the pin 72 moving through the groove 70.

In applying and removing the foot pedal 65 and arm 68 to and from the block 67, the engagement of pin 76 with the inner ends of the slots 77 in the sleeve 74 prevents the pin 72 from moving past the opening 73 and clearing the end of the block 67, thereby positively ensuring the proper manipulation and positioning of the foot pedal 65 and arm 68 in the block 67.

It will be noted that the rock shaft 55 will be turned in a clockwise direction by means of the foot pedal 65, when manual pressure is applied to said foot pedal.

The brakes are applied and the power circuit is opened when the operator removes his foot from the foot pedal 65, as will be hereinafter described, and according to one feature of the invention, means are provided for biasing the pedal to its brake applying position and preferably emergency brake pipe pressure is employed as the biasing pressure instead of the usual spring.

The means for biasing the pedal to the brake applying position is a pneumatically operated device 66 which comprises a casing secured to the member 8 of the control device housing by means of bolts 79. The casing contains a movable abutment 100 operative to effect an application of the brakes upon the relief of foot pressure on the foot pedal 65, said abutment consisting of a trunk-like piston member 80 provided with a screw-threaded stud 81, a follower or clamping member 82 mounted over said stud, a packing cup 83 interposed between said piston and follower member, and a nut 113 having screw-threaded engagement with said stud for clamping the packing cup between the piston and follower member. The abutment 100 forms at one side a chamber 84 and at the opposite side a chamber 85 which is open at all times to the atmosphere through the interior of the control device housing. A pipe 86 connects to chamber 84 and leads to the fluid pressure supply chamber 155 in the brake valve device.

In order to provide for a substantially constant pressure reaction on the foot pedal 65, a compensating connection is interposed between the abutment 100 and the foot pedal arm 68 and comprises a compensating lever 88 which is interposed between and pivotally mounted on a pin 89 carried by two lugs 87 projecting from the casing of the pneumatically operated device 66. The outer end of the lever 88 is preferably bifurcated and one end of a link 90 is pivotally mounted between the prongs of said lever on a pin 91 passing through said prongs. The other end of link 90 is pivotally connected to a pin 92 in the piston member 80 so that movement of the abutment 100 will impart rotation to the compensating lever 88. One end of a link 93 is pivotally mounted between the prongs of the compensating lever 88 on a pin 94 passing through said prongs and the other end of link 93 is pivotally connected to a pin 95 provided through a slot in a lever 96 which is formed integral with and projects from the lever member 60. From the above description, it will be evident that fluid under pressure in chamber 84 acting on the abutment 100 tends to rotate the compensating lever 88, the lever member 60 secured to the rock shaft 55, and the foot pedal 65 in a counter-clockwise direction, whereas the pressure of the operator's foot on the pedal 65 opposes such counter-clockwise rotation and tends to rotate the rock shaft 55 and lever member 60 in the reverse direction, as will be hereinafter described in detail.

The compensating lever 88 is shown in its normal position in Fig. 3 and it will be noted that the moment arm for link 90 is shorter than the moment arm for link 93, but as the compensating lever is rotated in a counter-clockwise direction from the normal position, the moment arm for link 90 increases, while after a certain small degree of rotation of the lever member 60, the moment arm for link 93 decreases.

The foot pedal 65 is adapted to be moved by the fluid pressure actuated abutment 100, upon the relief of manual pressure on said foot pedal, from the normal position, as shown in Fig. 3, first through, what may be called a "power on-brakes released" zone, then through a "power off-brakes released" zone and then or finally through a "power off-brakes applied" zone. Upon applying foot pressure to pedal 65, the foot pedal is rotated, against the pressure of fluid acting on the abutment 100, through said zones in the reverse order, as will be evident.

It is desirable that the pressure exerted by the operator's foot on foot pedal 65 to control the operation of the control device be relatively low and substantially constant through all of the operating zones of the foot pedal in order not to tire the operator any more than necessary; and this is attained through the varying of the lever ratio between the abutment 100 and foot pedal 65 by means of the compensating lever 88. It will be evident that when the foot pedal 65 is depressed to its lowest position a certain pressure is required to hold the pedal in said position against the opposing pressure of fluid acting on the abutment 100. As the pedal is allowed to move upwardly, there is a slight, though unimportant, increase of force delivered by the abutment 100 to the foot pedal due to the slight increase in length of the moment arms for both of the links 90 and 93, but this increase is less for link 93 than for link 90.

At the time the pedal 65 enters the "power off-brakes applied" zone, the roller 54 engages the face 53 of the brake valve operating lever 50 so as to operate the brake valve device, and the power required to operate said brake valve device then increases as the lever 50 is rotated in a clockwise direction and decreases as said lever is rotated in the reverse direction.

At substantially the time the roller 54 engages the brake valve operating lever 50, the moment arm for link 93, with respect to the compensating lever 88, has increased to its maximum degree, so that upon further movement of the compensating lever 88 to operate the brake valve lever 50 the moment arm for link 93 decreases, while the moment arm for link 90 continues to increase, thus increasing the force delivered by the abutment 100 to the brake valve lever 50 according to the force required to operate the brake valve device throughout the "power off-brakes applied" zone. This force delivered by the abutment 100 for operating the brake valve device reduces upon movement of the pedal 65 towards the "power off-brakes released" zone in accordance with the reduction in force required for operating the brake valve device, as will be evident. The leverage ratio controlled by the compensating lever 88 is thus varied according to the power required to operate the brake valve device, so that the pressure of the operator's foot on the pedal 65 remains substantially the same in any position in the "power off-brakes applied" zone, as at the time the pedal entered said zone, and this pressure is substantially the same as when the pedal 65 is in either of the other two operating zones.

The maximum degree of application of brakes depends upon how far the pedal 65 is permitted to move upwardly into the "power off-brakes applied" zone. This movement of the pedal is limited by the engagement of a bumper 107 projecting from a lug 108, which forms a part of the lever member 60, with an adjustable stop block 109 clamped to the side wall of the control device housing by means of two cap screws 111. The stop block 109 may be adjusted from the outside of the housing, so as to vary the distance which the pedal 65 is permitted to move into the "power off-brakes applied" zone, by loosening the cap screws 111. The elongated slot 112 in the housing through which the cap screws extend then permit the raising or lowering of the block 109. When the block 109 is positioned properly for defining the position of the pedal 65, as desired, the screws 111 are tightened to securely clamp the block 109 to the housing. The bumper 107 is preferably resilient and made of a rubber composition and is secured in a recess in lug 108 by means of a pin 110, so that if the movement of the control valve parts to effect an application of the brakes is rapid, as in case of sudden removal of the operator's foot pressure on pedal 65, said movement will be resiliently stopped by the engagement of the rubber bumper 107 with the stop block 109 and thereby prevent the possible breakage of parts of the device.

Heretofore, in devices of this character, a spring has been employed to provide the motive power for causing the brakes to be applied when the operator removes his foot from the foot pedal. It is well known that a spring, if suddenly relieved of pressure, will expand almost instantly and when used as the motive power in a device of this character, it would, upon complete and sudden removal of foot pressure from pedal 65, cause such sudden operation of the various parts of the device as to slam the bumper 107 against the stop block 109 with destructive force. According to the invention, this difficulty is overcome by subjecting the abutment 100 to fluid pressure instead of the pressure of a spring. With the use of fluid pressure, the rapid movement of the abutment 100 towards its lower position causes a very considerable, though only momentary, reduction in the pressure of fluid in chamber 84 so that at the instant the bumper 107 engages the stop block 109 the actual moving force and consequently the blow to be absorbed by such engagement will be much less than in the case of a spring. After such engagement, the fluid pressure immediately builds up on the abutment 100 to the pressure of fluid at the source of supply so as to ensure the device remaining in the brakes applied position, but it will be evident that this increase in force applied against the stop block 109 is not effective until after the bumper 107 engages said block and therefore does not tend to break parts of the device as if the total force were suddenly applied to the stop block as in the case of a spring. In this same connection it will also be evident, that due to the frictional resistance to movement of the abutment 100 in its cylinder and on account of having to overcome its inertia, the movement of the abutment is inherently slow as compared to the instantaneous expansion of a spring and this characteristic in addition to the above explained momentary reduction in the actuating fluid pressure on abutment 100 provides for a relatively slow moving abutment which also tends to reduce the possibility of breakage of the parts of the device. It will be understood that the rate of movement of the abutment 100 and the force with which the bumper 107 strikes the block 109 is relative to the action of a spring and provides just as efficient and effective functioning of the control device, as would a spring.

The casing of the pneumatically operated device 66 is provided with a passage opening into chamber 84 and said passage is normally closed by a pipe plug 97 accessible from the outside of the control device casing. When the pipe plug 97 is removed, a lubricant such as oil may be supplied to chamber 84 and to an annular cavity 98 formed between the follower member 82 and the nut 113. From cavity 98 oil then flows through a plurality of ports 99 to a felt packing 101 provided in an annular groove in the follower member 82. The felt packing 101 engages the cylinder wall in which the abutment 100 is adapted to reciprocate so that lubricant absorbed and carried by said packing is spread over said cylinder wall.

The chamber 84 at one side of the felt packing 101 is open through passages 102 and 103 in the piston stud 85 to an annular chamber 104 and from from thence through a plurality of passages 105 to a chamber 106 at the opposite side of the felt packing 101. This communication is provided in order to prevent obtaining a difference in pressures on the opposite sides of the felt packing, in case of a rapid increase or decrease in pressure in chamber 84, which would tend to blow the oil out of the felt packing.

The power circuit of the car is controlled by a circuit breaker device 118 mounted on the top of the control device housing, and said circuit breaker device may be of the same construction as disclosed in the pending application of Rankin J. Bush, Serial No. 630,733, filed August 27, 1932. The circuit breaker device is controlled by a push rod 115, one end of which extends into said circuit breaker device, while the other end is pivotally secured to a lever arm 114, projecting from the lever member 60, by means of a pin 116. The push rod 115 freely extends through a bore in a lug 117 projecting from the casing of the pneumatically operated device 66 and an opening is provided in the top of the control device housing to permit the rod to extend into the circuit breaker device.

The lever arm 114 on the lever member 60 is so arranged as to move the push rod 115 upwardly when the foot pedal 65 is depressed to its normal position, as indicated in Fig. 3, and this movement of the push rod 115 is adapted to operate the circuit breaker device to close the power circuit of the car. Upon the relief of foot pressure on the foot pedal 65, the operation of the lever member 60 by the abutment 100 is adapted to pull the push rod 115 out of the circuit breaker device so as to open the power circuit at substantially the time the foot pedal 65 leaves the "power on-brakes released" zone and enters the "power off-brakes released" zone.

The control device is provided with a door interlock member 119 which is preferably formed of sheet material to the desired shape. The member 119 is provided with two ears or upwardly projecting portions 120 and 121, and a lever portion 122. The ears 120 and 121 are spaced so as to freely span the ends of the lever member 60 and each ear is provided with a bore adapted to freely fit over the rock shaft 55. To mount the member 119 on the rock shaft 55, said member is first positioned relative to the lever member 60 and then together the member 119 and lever member 60 are mounted on the rock shaft 55. The lever member 60 is then pinned to the rock shaft 55 by pins 61 as hereinbefore described. When the rock shaft 55 and members 119 and 60 are then assembled in the brackets 57, the ear 120 of member 119 is between one end of the lever member 60 and one bracket 57 while the ear 121 of member 119 is between the other end of lever member 60 and the other bracket 57. It will be noted that the member 119 is free to turn on the rock shaft 55.

The lever portion 122 of the member 119 is located off center and is adapted to engage a door interlock push rod 123 which slidably extends through a suitable boss 124 secured to the base plate 7 of the control device housing.

A lug 125 is provided on the lever member 60 and projects out over the member 119. An adjusting screw 126, having screw-threaded engagement in a suitable bore through lug 125, is carried by said lug and is adapted to move the member 119 and push rod 123 to the normal position illustrated in Fig. 3 when the foot pedal 65 is also in the normal position. Upon the relief of manual pressure on the foot pedal 65, the pressure exerted by member 119 on the push rod 123 is removed so that when the foot pedal moves into the "power off-brakes applied" zone, the adjusting screw 126 may be so positioned relative to the member 119 as to permit manual control of the car door, as will be hereinafter described. The exact position of the foot pedal in which the manual control of the car door is obtained may be adjusted by turning the adjusting screw 126 in the lug 125. A lock nut 127 is provided on the adjusting screw for locking said screw in the adjusting position.

The door of the car may be operated by the door engine 3 which comprises a casing containing two movable pistons 128 and 129 of different areas. The pistons 128 and 129 are connected by a rod 130 provided on one side with gear teeth engaging a gear segment 131 which is adapted to be turned by the reciprocation of said pistons in a direction dependent upon the direction of movement of the pistons. The gear segment 131 may be connected by mechanical means (not shown) to a car door and adapted to open or close the car door according to the direction of rotation of the gear, in the usual well known manner.

A chamber 132 is formed between the door engine pistons 128 and 129 and is at all times open to the atmosphere. A chamber 133 is provided at the outer face of the larger piston 128 and a chamber 134 at the outer face of the smaller piston 129. Chamber 134 is connected directly to main reservoir 5 through pipe 135 so that fluid at main reservoir pressure is constantly effective in chamber 134 upon the smaller piston 129. Fluid under pressure is adapted to be supplied to and vented from the piston chamber 133 in accordance with the position of the door engine control valve device 4.

The door engine control valve device 4 may comprise a casing containing a plug valve 136 adapted to be turned by means of a handle 137 from the door closed position indicated in the drawings, to the door opening position in which position the handle 137 will occupy the position illustrated in dot and dash lines and the plug valve 136 will occupy a corresponding position.

In the door closed position of the door engine control valve device 4, the chamber 133 at the outer face of the large piston 128 is vented to the atmosphere through pipe 138, cavity 139 in plug valve 136 and atmospheric passage 140 so as to permit the pressure of fluid in chamber 134, acting on piston 129, to hold said piston and piston 128 in the door closed position. In order to open the car door, the plug valve 136 is turned to the door opening position by means of the handle 137. In the door opening position, the cavity 139 in plug valve 136 connects pipe 138 to pipe 135 so that fluid at main reservoir pressure is permitted to flow to chamber 133 at the outer side of the larger piston 128. The force exerted by the larger piston 128 then overcomes the opposing force exerted by the smaller piston 129 and moves the door engine pistons toward the right hand to open the car door. When the valve device 4 is turned to the door closed position the chamber 133 is again vented and the door engine pistons 128 and 129 are moved back to the door closed position by the pressure of fluid acting in chamber 134.

The movement of the door control valve device 4 to door opening position can be effected only when the foot pedal 65 is in the "power off-brakes applied" zone. In both of the "brakes released" zones, the push rod 123, being depressed by the member 119, operates a lever 141 to project a stop member 142 into the path of rotation of the door control valve handle 137 so that said handle will engage said stop member and cannot therefore be moved to door opening position. However, when the foot pedal is moved into the "power off-brakes applied" zone, the pressure of member 119 is removed from push rod 123 which will permit the door control valve handle 137 to be turned to the door opening position, if desired.

An electric switch or circuit breaker may be associated with the door engine and comprises a movable, insulated contact 143 carried by a suitable lug projecting from the rod 130 connecting the door engine pistons. When the door engine is in closed position, the insulated contact 143 may bridge two fixed contacts 144. One of the fixed contacts 144 may be connected by a wire 145 to the circuit breaker device 118 mounted on the control device 1, while the other fixed contact 144 may be connected by a wire 146 to a controller 147 adapted to control the supply of current to a car motor 148, one side of which is grounded. The other lead from the circuit breaker 118 may be connected to a trolley 149. From the above description it will be noted that when the foot pedal 65 is depressed to the "power on-brakes released" zone and the door engine 3 is in the door closed position, a circuit will be closed from trolley 149 to the controller 147 so that power may be applied to the car motor 148 for driving the car, but when either the foot pedal is moved out of the "power on-brakes released" zone or when the car door engine is in door opening position, the power is cut off to the controller 147, so that the car motor 148 cannot be operated to apply motive power to the car.

The emergency valve device 2 may comprise a casing containing a piston 150 having at one side a piston chamber 151 and at the opposite side a valve chamber 152 containing a slide valve 153 adapted to be operated by said piston. The valve chamber 152 is in constant communication with the main reservoir 5 through pipe 135, while piston chamber 151 is open to the emergency pipe 22. A spring 180 is provided in piston chamber 151 for urging the piston 150 and slide valve 153 to their normal position as indicated in the drawings.

In operation, fluid at the pressure carried in the main reservoir 5 flows through pipe 135 to piston chamber 134 in the car door operating engine 3, to valve chamber 152 in the emergency valve device and through a choke plug 154 to the emergency pipe 22. Fluid under pressure supplied to the emergency pipe 22 flows to the emergency valve piston chamber 151 and to chamber 155 in the brake valve device 13 and from thence through pipe 86 to chamber 84 at the upper side of the movable abutment 100. With the foot pedal 65 fully depressed, the movable abutment 100 is held in its upper position against the opposing pressure of fluid in chamber 84.

With the foot pedal depressed, the roller 54 is held out of engagement with the brake valve operating lever 50 which permits the control spring 44 and bias spring 36 to expand. The bias spring 36 urges the abutment 18 to the release position and spring 44 urges the member 42 into engagement with the casing. With the abutment 18 in release position, stud 40 is moved away from the stem of the application valve 24 which permits spring 26 to seat said valve, while the release valve 27 is raised from its seat by engagement of the operating arm 37 with the head-like portion 31. With the release valve 27 unseated, the brake cylinder chamber 20 is vented to the atmosphere through chamber 20 and pipe 29.

When the pressure of fluid in the emergency piston chamber 151 is increased by the supply through choke plug 154 to substantially the same degree as acting in valve chamber 152, spring 180 urges piston 150 and slide valve 153 to their normal position. In the normal position of the emergency valve slide valve 153 the brake cylinder 6 is vented to the atmosphere through pipe 156, a cavity 157 in said slide valve, pipe 21 leading to the brake cylinder chamber 20 in the brake valve device and from thence past the unseated release valve 27.

With the foot pedal 65 fully depressed, the circuit breaker device 118 mounted on the housing of the control device is closed and the door control valve device 4 is held in the door closed position so that the door engine switch device is also closed, thus current is supplied to the controller 147 so that current may be applied to the car motor 148 for moving the car.

If it is desired to effect an application of the brakes, foot pressure is removed from the foot pedal 65 to permit the pressure of fluid acting on the abutment 100 to rotate the rock shaft 55 and lever member 60 in a counter-clockwise direction. As the pedal 65 moves upwardly, the circuit breaker device 118 mounted on the control device housing operates to cut off the supply of current for operating the car motor 147 at substantially the time the pedal moves from the "power on-brakes released" zone into the "power off-brakes released" zone. Then at the time the pedal moves from the "power off-brakes released" zone into the "power off-brakes applied" zone, the roller 54 carried between the ends of the arms 62 and 63 engages the brake valve operating lever 50 and rotates it in a clockwise direction.

This rotation of the brake valve operating lever 50 urges the member 42 downwardly in the brake valve casing. This causes the control spring 44 to move the abutment 18 downwardly against the pressure of the bias spring 36. As the abutment 18 thus moves downwardly, it initially seats the release valve 27 so as to close communication from the brake cylinder chamber 20 to the atmosphere. Further movement of the abutment 18 is then relative to the release valve 27, as permitted by spring 38, but the stud 40 carried in the arm 34 engages the stem of the application valve 24 and moves said valve away from its seat.

Upon unseating the application valve 24, fluid under pressure supplied from the main reservoir 5 through pipes 135 and 22 to the application valve chamber 155 flows to the brake cylinder chamber 20 and from thence through pipe 21, cavity 157 in the emergency valve slide valve 153 and pipe 156 to the brake cylinder 6. When the pressure acting in chamber 20 on the abutment 18 is thus increased to a degree slightly exceeding the opposing pressure of spring 44, the abutment 18 moves toward the spring 44 and permits the application valve 24 to seat and thus prevent any further increase in pressure in chamber 20 and the brake cylinder 6. The movement of the abutment 18 ceases immediately after seating of the application valve 24 and before unseating of the release valve 27 due to the increase in pressure of the control spring 44 caused by the movement of said abutment. In this manner the brake cylinder pressure is limited by the pressure of the control spring 44, the pressure of which on the abutment 18 varies substantially according to the degree of rotation of the lever 50 as controlled by the position of the foot pedal 65.

If only a light application of the brakes is desired, the foot pedal 65 is permitted to move upwardly into the "power off-brakes applied" zone only a slight distance thereby causing a slight increase in pressure of the control spring 44 on the abutment 18 which then operates to obtain a correspondingly low pressure in the brake cylinder. If a further application of the brakes is desired, the foot pedal 65 is permitted to move upwardly a further distance which causes a corresponding increase in pressure on the control spring and results in a corresponding increase in pressure in the brake cylinder 6 and brake cylinder chamber 20 in the brake valve device. The maximum degree of brake cylinder pressure is obtainable when the pressure of the control spring 44 is increased to its maximum degree as governed by the engagement of the bumper 107 with the stop block 109.

In order to effect a release of the brakes after an application, the foot pedal is pressed downwardly against the resistance of the pressure of fluid in chamber 84 acting on the abutment 100. This movement of the foot pedal 65 and the consequent rotation of the lever arms 62 and 63 on the lever member 60 away from the brake valve operating lever 50, permits the control spring 44 in the brake valve device to expand and thus reduce the downwardly acting pressure on the abutment 18.

Upon reducing the pressure of spring 44 on abutment 18, the fluid at brake cylinder pressure in chamber 20 acting on the opposite side of abutment 18 shifts said abutment upwardly and unseats the release valve 27 which permits fluid under pressure to be vented from the brake cylinder 6 through pipe 156, cavity 157 in the emergency valve slide valve 153, pipe 21, chamber 20 in the brake valve device, past the release valve 27 to chamber 28 and from thence to the atmosphere through pipe 29.

If the foot pedal 65 is moved out of the "power off-brakes applied" zone the pressure on spring 44 is reduced to normal so that the bias spring 36 is permitted to maintain the abutment 18 in the normal or release position, in which case a full release of fluid under pressure from the brake cylinder will be effected.

However, if the foot pedal is only moved part way toward the "power off-brakes released" zone, then the brake cylinder pressure acting on the abutment 18 will only be reduced according to the reduction in pressure on spring 44, at which time, the abutment 18 will be moved downwardly by the control spring 44 to seat the release valve 27. In this manner the brake cylinder pressure may gradually be reduced in steps, if desired.

It will be noted that the power required to operate the brake valve lever 50, in effecting an aplication of the brakes and in effecting a release of the brakes after an application, increases as the brake cylinder pressure in chamber 20 acting on the abutment 18 is increased, and reduces as said brake cylinder pressure is reduced. The compensating lever 88 is so arranged and operative, as hereinbefore described, in effecting an application and a release of the brakes that the power delivered by the abutment 100 through the lever member 60 to the brake valve lever 50 varies directly as the power required to operate the brake valve device, so that the control pressure of an operator's foot on the foot pedal 65 remains substantially constant throughout the "power off-brakes applied" zone and substantially the same as in the other two zones.

When the foot pedal 65 is moved into the "power off-brakes applied" zone, the pressure of member 119 is removed from the push rod 123 so that the door engine control valve device 4 may be operated to effect the operation of the door engine 2 to open the car door (not shown), if desired, but when the foot pedal is moved from the "power off-brakes applied" zone to the "power off-brakes released" zone, the lever member 119 operates the push rod 123 to move the door engine control valve device 4 to the door closing position, if not already in said position, in order that the car door (not shown) will not be open when the brakes on the car are released.

It may be desirable to prevent the car door engine 3 from being operated to open the door of a car until after a predetermined degree of pressure is obtained in the brake cylinder 6. In this case, the member 119 is adjusted, by means of screw 126, so that the rod 142 will not be pulled away from the handle 137 of the car door engine control valve device 4 a distance sufficient to permit said valve device to be turned to door opening position until the foot pedal 65 is, for instance, midway of the "power off-brakes applied" zone. This operation can be adjusted as desired, as will be evident.

Since the supply of current to the controller 147 for operating the car motor 148 is controlled by the circuit breaker device 118 on the control device housing and by the door engine switch contact 143, it will be evident that current cannot be aplied to the car motor 148 for propelling the car except when the foot pedal is in the "power on-brakes released" zone and when the car door engine is in the door closed position. By this interlock of the motor circuit, it is impossible to supply current to the car motor 148 for starting a car until after the car brakes have been released and the car door has been closed.

The "power off-brakes released" zone in which the car motor circuit is opened by the circuit breaker 119, the brakes are released and the car door cannot be opened, is provided for coasting of a car, as for instance, on a descending grade.

The supply of fluid under pressure for applying the brakes and for moving the control abutment 100 is provided through the emergency pipe 22 which also leads to piston chamber 151 of the emergency valve device, so that, if for any reason, such as a broken emergency pipe, the pressure of fluid required to actuate the abutment 100 to effect an application of the brakes is suddenly reduced or lost, the reduction in pressure in the emergency piston chamber 151 permits the pressure of fluid in valve chamber 152 to move the piston 150 and slide valve 153 to emergency position in which the brake cylinder pipe 156 is opened directly to the valve chamber 152 so that fluid under pressure is permitted to flow directly from the main reservoir 5 through said valve chamber to the brake cylinder 6 and apply the brakes in emergency. If the emergency valve device were not employed as above described, it is possible that if the foot pedal were being held in the extreme depressed position, the loss of fluid pressure in chamber 84 on the abutment 100 would not be noticed until it was desired to apply the brakes. Then, the brakes could not be applied and it is possible that a serious disaster might result, but this difficulty is avoided, according to the invention, by interlocking the actuating fluid pressure in chamber 84, with the emergency valve device 2, as above described.

The choke plug 154 is provided between the main reservoir pipe 135 and the emergency pipe 22 in order to restrict the flow of fluid under pressure from the main reservoir to said emergency pipe so that the emergency pipe pressure may reduce, if necessary, sufficiently fast to cause operation of the emergency valve device to effect an emergency application of the brakes. In case of a broken emergency pipe there will be a continuous venting of fluid under pressure from the main reservoir through said choke plug to the emergency pipe 22 and thence to the atmosphere, but the rate of venting is less than the rate at which fluid under pressure will be supplied to the main reservoir 5, in the usual well known manner.

The supply of fluid, in effecting an application of the brakes by operation of the foot pedal 65, is drawn from the emergency pipe 22 through choke plug 154 as hereinbefore described, but the flow area of the opening through said choke plug is adequate to permit the brake valve device 13 to apply the brakes at the desired rate.

It will now be noted that in accordance with the invention, the brake valve device is operative by the pressure of fluid acting on the abutment 100, upon the relief of manual pressure on the foot pedal 65, to effect an application of the brakes, and is operative by manual pressure on the foot pedal 65 to move the abutment against the pressure of fluid acting thereon to effect a release of the brakes. The supply of fluid for actuating the abutment 100 is obtained from the emergency pipe so that in case of loss of fluid pressure on the abutment 100, an emergency application of the brakes will automatically be effected.

The power required for operating the brake valve device varies directly as the degree of brake application, and in accordance with the invention, the power delivered by the fluid pressure actuated abutment 100 varies accordingly, so that the manual pressure required on the foot pedal remains substantially constant throughout its operating range.

The foot operated pedal is provided with three operating zones, the "power on-brakes released" zone in which power may be applied to the car motor but the brakes cannot be applied, neither can the car door be opened, the "power off-brakes released" zone for coasting purposes and in which the power is cut off to the car motor, the brakes cannot be applied and the car door cannot be opened, and finally, the "power off-brakes applied" zone in which the brakes can be applied and released, as desired. In this final position, power cannot be applied to the car motor but the car door can be opened at the time the door interlock member 119 permits, according to its adjustment. By this arrangement, the application of power to the car motor, the braking of the car and the operation of the car door are so interlocked as to prevent improper operation of the car and to provide the maximum of safety.

While one illustrative embodiment of the invention has been described in detail, it is not our intention to limit its scope to that embodiment or otherwise than by the terms of the appended claims.

Having now described our invention, what we claim as new and desire to secure by Leters Patent, is:

1. In a fluid pressure brake, the combination with a brake cylinder, of a brake valve device operative to supply and release fluid under pressure to and from said brake cylinder and comprising a movable member operated by a control pressure for providing a pressure in said brake cylinder in accordance with the degree of said control pressure, and means for varying the degree of said control pressure on said movable member in accordance with the degree of pressure desired in said brake cylinder, said means comprising a lever member operative by manual pressure to reduce said control pressure, and a movable abutment associated with said lever member, said movable abutment being subject to fluid under pressure and operated thereby upon the relief of manual pressure on said lever member for increasing the control pressure on said movable member.

2. In a fluid pressure brake, the combination with a brake cylinder, of a brake valve device operative to supply and release fluid under pressure to and from said brake cylinder and comprising a movable member subject to a control pressure and operative automatically according to the degree of said control pressure to provide a proportional pressure in said brake cylinder, lever means associated with said movable member and operative by manual pressure to reduce the control pressure on said movable member, and means associated with said movable member and subject at all times to fluid under pressure and operated thereby, upon the relief of manual pressure on said lever means, to increase the control pressure on said movable member.

3. In a fluid pressure brake, the combination with a brake cylinder, of a brake valve device operative to supply and release fluid under pressure to and from said brake cylinder and comprising a movable member subject to a control pressure and operative according to the degree of said control pressure to provide a proportional pressure in said brake cylinder, means associated with said movable member and operative by manual pressure to reduce the control pressure on said movable member, fluid pressure actuated means associated with said movable member and operative by fluid under pressure, upon the relief of manual pressure on said means, for increasing the control pressure on said movable member, and leverage varying means interposed between said fluid pressure actuated means and said movable member for varying the pressure exerted by said fluid pressure actuated means upon said movable member in accordance with the opposing pressure acting on said movable member.

4. In a fluid pressure brake, the combination with a spring and valve means operative by said spring for applying the brakes with power proportional to the compression of said spring, of means subject at all times to fluid under pressure and actuated thereby for compressing said spring to effect the operation of said valve means, manually operated means for opposing the compressing of said spring by the fluid pressure actuated means, and means for increasing the pressure transmitted from said fluid pressure actuated means to said spring as the spring is compressed.

5. In a fluid pressure brake, the combination with a spring and means for applying the brakes with power proportional to the compression of said spring, of fluid pressure actuated means for compressing said spring, manually operated means for opposing the compressing of said spring by the fluid pressure actuated means, lever means for transmitting fluid pressure from said fluid pressure actuated means to said spring, and means associated with said lever means for varying the lever ratio of said lever means as said spring is compressed.

6. In a fluid pressure brake, the combination with a brake cylinder, of a brake valve device controlled manually and actuated by fluid under pressure upon the relief of manual pressure to supply fluid under pressure to said brake cylinder to effect an application of the brakes, and valve means controlled by the brake valve actuating fluid pressure and operative upon a reduction in the pressure of said actuating fluid to close the communication through which fluid under pressure is supplied to said brake cylinder by the operation of said brake valve device and to supply fluid under pressure to said brake cylinder.

7. In a fluid pressure brake, the combination with a brake cylinder, of a brake valve device controlled manually and actuated by fluid under pressure upon the relief of manual pressure to supply fluid under pressure to said brake cylinder to effect an application of the brakes, and valve means controlled by the brake valve actuating fluid pressure and operative upon the loss of said actuating fluid to close the communication through which fluid under pressure is supplied to said brake cylinder by the operation of said brake valve device and to supply fluid under pressure to said brake cylinder.

8. In a fluid pressure brake, the combination with a brake pipe, and a valve device operated upon a reduction in brake pipe pressure for effecting an application of the brakes, of means operated by the pressure of fluid in said brake pipe for effecting an application of the brakes, and means operated by manually applied pressure for preventing the operation of the fluid pressure operated means, said valve device controlling communication through which fluid under pressure is supplied to said brake cylinder by the operation of said means, and operative upon a reduction in brake pipe pressure to close said communication.

9. A control device comprising a housing, a brake valve device mounted in said housing and secured thereto, said brake valve device comprising a movable member movable through a zone for varying the degree of application and release of the brakes, a manually controlled element, a fluid pressure controlled abutment operative upon the relief of manual pressure on said element to operate said movable member to effect an application of the brakes, and a stop member secured to said housing and adjustable from the exterior of the housing for limiting the movement of said movable member in said zone in effecting an application of the brakes.

10. A brake and door controlling device comprising a brake valve device for controlling the application and the release of brakes, a manually operated valve device for controlling the opening and closing of a car door and having a door opening position and a door closing position, manually operated means for positioning the car door control device in the door closing position and for permitting the operation of the brake valve device to effect a release of the brakes, and pneumatically operated means operative upon the relief of manual pressure on said manually operated means for effecting the operation of said brake valve device to apply the brakes, said car door control device being movable to said door opening and door closing positions only after the operation of said pneumatically operated means to effect the operation of the brake valve device to apply the brakes.

11. In a fluid pressure brake, the combination with a brake valve device operative to control the application and the release of the brakes on a car, of a circuit breaker device for controlling the motive power circuit on the car, a valve device having a door opening position and a door closing position for controlling the opening and closing of a door on the car, a member operative when subject to pressure to hold said valve device in said door closing position, manually operated means operative to apply pressure to said member to operate the circuit breaker device to close the power circuit and to permit operation of said brake valve device to effect a release of the brakes on the car, and pneumatically operated means operative upon the relief of manual pressure on said manually operated means to operate said brake valve device to effect an application of the brakes and to relieve the pressure on said member, said valve device being movable manually to the door opening and door closing positions upon the relief of pressure on said member, said circuit breaker device being automatically operative to open said power circuit upon the operation of said pneumatically operated means.

12. A control device for a car comprising a casing, a rocking member operatively mounted in said casing, a lever arm carried by said rocking member for controlling the application and release of the brakes on the car, another lever arm carried by said rocking member operative to control the opening and closing of the power circuit on the car, and means associated with said rocking member for controlling the opening and closing of a door on the car, a foot operated pedal associated with said rocking member for rocking said rocking member in one direction for operating said lever arms and said means to effect a release of the brakes, to close the power circuit and to close the car door, and pneumatically operated means operative upon the relief of manual pressure on said foot pedal for rocking said rocking member in the reverse direction to operate said lever arms and means to effect an application of the brakes and to permit opening of the power circuit and opening of the car door.

13. In a fluid pressure brake, the combination with a spring, and means controlled by said spring for applying the brakes in proportion to the pressure of said spring, of means actuated by fluid under pressure for compressing said spring to effect the operation of said spring controlled means, and manually operated means for opposing the action of the fluid pressure actuated means on said spring.

14. In a fluid pressure brake, the combination with a spring, and means controlled by said spring for applying the brakes in proportion to the pressure of said spring, of means subject at all times to and actuated by fluid under pressure for compressing said spring to effect the operation of said spring controlled means, and manually operated means for opposing the action of the fluid pressure actuated means on said spring.

15. In a fluid pressure brake, the combination with a spring, and means operated by said spring for applying the brakes with power in proportion to the pressure of said spring, of a manually operated lever for controlling the pressure of said spring, resilient means acting in opposition to manual pressure on said lever and operative upon the relief of manual pressure on said lever to increase the pressure of said spring, and leverage varying means interposed in the connection between said resilient means and spring, said leverage varying means being so arranged as to vary the power delivered from said resilient means to said spring in accordance with the change in pressure in said spring.

16. In a fluid pressure brake, the combination with resilient means and a lever controlled by manual pressure and having a normal depressed position, said lever being movable from said position through a zone by the action of said resilient means, a circuit breaker device closing a power circuit in the normal position of said lever, a brake valve device comprising a spring operative to effect an application of brakes with power proportional to the pressure of said spring, and means operative by said resilient means upon the relief of manual pressure on said lever for first operating said circuit breaker device to open said power circuit and to then vary the pressure of said spring in accordance with the degree of movement of said lever, and thereby to effect an application of the brakes according to the pressure of said spring.

17. In a fluid pressure brake, the combination with resilient means and a lever controlled by manual pressure and having a normal depressed position, said lever being movable by said resilient means from said position through a brakes released zone and a brakes applied zone, a circuit breaker device for controlling a power circuit, means controlled by said resilient means and lever for operating said circuit breaker device to close said power circuit when said lever is in said normal position, said circuit breaker device being operative prior to movement of said lever to said brakes applied zone to open said power circuit, a self-lapping brake valve device comprising a spring for effecting an application of the brakes with power proportional to the pressure of said spring, and means operative upon movement of said lever into said brakes applied zone for increasing the pressure of said spring in accordance with the position of said lever in said brakes applied zone.

18. In a fluid pressure brake, the combination with resilient means and a lever controlled by manual pressure and having a normal depressed position, said lever being movable from said position by said resilient means through first a power on-brakes released zone, then through a power off-brakes released zone and finally through a power off-brakes applied zone, a circuit breaker device for controlling a power circuit, means controlled by said resilient means and lever for operating said circuit breaker device to close said power circuit when said lever is in said power on-brakes released zone, said circuit breaker device being operative upon movement from said power on-brakes released zone into said power off-brakes released zone to open said power circuit, a self-lapping brake valve device comprising a spring for effecting an application of brakes with power proportional to the pressure of said spring, and means operative upon movement of said lever from the power off-brakes released zone into the power off-brakes applied zone to start compressing said spring and to vary the pressure of said spring in accordance with the position of said lever in said power off-brakes applied zone.

19. In a brake and door controlling apparatus, the combination with a brake valve device for controlling the application and release of brakes, a member normally subject to manual pressure for permitting the operation of said brake valve device to effect a release of the brakes, resilient means operative upon the relief of manual pressure on said member for effecting the operation of said brake valve device to effect an application of the brakes, valve means for controlling the opening and closing of a car door and having a door opening position and a door closing position, and means operative when said member is subject to manual pressure to hold said valve means in the door closing position.

20. In a brake and door controlling apparatus, the combination with a brake valve device for controlling the application and release of brakes, a member normally subject to manual pressure for permitting the operation of said brake valve device to effect a release of the brakes, resilient means operative upon the relief of manual pressure on said member for effecting the operation of said brake valve device to effect an application of the brakes, valve means for controlling the opening and closing of a car door and having a door opening position and a door closing position, and means operative when said member is operated by manual pressure to move said valve means to the door closing position.

21. In a brake and door controlling apparatus, the combination with a brake valve device for controlling the application and release of brakes and a valve device having a door opening position for effecting the opening of a car door and a door closing position for effecting the closure of said car door, said valve device being movable to either one or the other of said positions when the brakes are applied by the operation of said brake valve device, and means operative upon the operation of said brake valve device to effect a release of the brakes to position said valve device in the door closing position.

JOHN S. McWHIRTER.
RANKIN J. BUSH.